United States Patent
Derschmidt

(10) Patent No.: US 9,746,364 B2
(45) Date of Patent: Aug. 29, 2017

(54) FLOWMETER HAVING PRESSURE DIFFERENCE SENSOR IN PARALLEL WITH DISPLACEMENT METER

(71) Applicant: AVL LIST GMBH, Graz (AT)

(72) Inventor: Otfried Derschmidt, Graz (AT)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 14/764,303

(22) PCT Filed: Jan. 22, 2014

(86) PCT No.: PCT/EP2014/051199
§ 371 (c)(1),
(2) Date: Jul. 29, 2015

(87) PCT Pub. No.: WO2014/118045
PCT Pub. Date: Aug. 7, 2014

(65) Prior Publication Data
US 2015/0369646 A1 Dec. 24, 2015

(30) Foreign Application Priority Data
Jan. 30, 2013 (AT) .................. 50063/2013

(51) Int. Cl.
*G01F 3/10* (2006.01)
*G01F 15/00* (2006.01)
*G01F 15/02* (2006.01)

(52) U.S. Cl.
CPC .............. *G01F 15/005* (2013.01); *G01F 3/10* (2013.01); *G01F 15/026* (2013.01)

(58) Field of Classification Search
None
See application file for complete search history.

(56) References Cited

U.S. PATENT DOCUMENTS

| 3,633,420 A * | 1/1972 | Holzem ................ G01F 15/026 73/199 |
| 4,193,299 A * | 3/1980 | Holzem ................ G01F 15/026 73/199 |
| 7,254,993 B2 | 8/2007 | Metzler et al. |
| 7,513,150 B2 | 4/2009 | Parris et al. |
| 7,905,141 B2 | 3/2011 | Wakamatsu |
| 7,905,142 B2 | 3/2011 | Wakamatsu |
| 2002/0166320 A1* | 11/2002 | Buscher ................ F01P 7/044 60/425 |

FOREIGN PATENT DOCUMENTS

| DE | 3019534 | 10/1981 | |
| DE | 253674 | 1/1988 | |
| GB | 931092 | 7/1963 | |
| GB | 2185785 | 7/1987 | |
| JP | S63148831 | 9/1988 | |
| JP | 40110023 A * | 6/1989 | ............... G01F 3/22 |
| WO | 2007143770 | 12/2007 | |

* cited by examiner

*Primary Examiner* — Harshad R Patel
(74) *Attorney, Agent, or Firm* — Dykema Gossett PLLC

(57) ABSTRACT

In a flow meter with a displacement meter (1) a parallel-connected pressure difference sensor (3) has a bypass channel (8) which frees a connection between the inflow side and the outflow side (4, 5) when a piston (7) butts against a maximum stroke stop (9). In the bypass channel (8) is a check valve (11) which prevents the backflow from the outflow side to the inflow side (5, 4) and thus enables a return of the piston (7) purely due to pressure.

2 Claims, 1 Drawing Sheet

FLOWMETER HAVING PRESSURE DIFFERENCE SENSOR IN PARALLEL WITH DISPLACEMENT METER

BACKGROUND OF THE INVENTION

The invention relates to a flowmeter having a displacement meter to which a pressure difference sensor is connected in parallel in a bypass line, wherein as a function of a differential pressure ascertained by the pressure difference sensor between the inflow side and the outflow side of the displacement meter, a motor rotatably connected to the displacement meter is controlled for constant differential pressure equalization, wherein the pressure difference sensor has a piston which is freely movable in a cylinder region of the bypass line and of which the deflection due to the occurrence of a differential pressure is determined and is used for control of the motor of the displacement meter, and wherein the bypass line has a bypass channel which frees a connection between the inflow side and the outflow side when a piston butts against a maximum stroke stop on the outflow side.

THE PRIOR ART

Such measuring devices are known for example from EP1644707B1, DE1798808B or also GB2185785A and have as central assemblies a displacement meter for example in the form of a gearwheel meter as well as a piston which is freely movable in a cylinder region of the parallel-connected bypass line as a pressure difference sensor. Liquid medium coming from the inflow side is channeled through the displacement meter in the direction of the outflow side, wherein the displacement meter is driven by a servomotor of which the speed can be controlled. Parallel to the displacement meter the space in the cylinder region of the pressure difference sensor on the intake side is connected to the intake of the displacement meter and the space in this cylinder region on the outlet side is connected to the outflow side of the displacement meter. By means of an electronic control system the aim is to position the piston of the pressure difference sensor always in its neutral position by differential pressure equalization. Every change of flow rate causes a deflection of the piston, which is immediately corrected by means of an adaptation of the speed of the motor of the displacement meter, whereby the speed of this motor is directly proportional to the monitored flow rate. Thus minimum flow rates or changes of flow rate can be determined very accurately, as is essential for example for the measurement of fuel consumption on test rigs for internal combustion engines.

In order to enable an additional flow off over the pressure difference sensor in the event of excessive volumetric flows or substantial pressure rises, due for example to a failure of the pump or a blockage in the system, the bypass line can also have, parallel to the displacement meter, a bypass channel which frees a connection between the inflow side and the outflow side when the piston butts against a maximum stroke stop. Also, especially in the event of restart, when the device is to be flushed (that is to say, freed of air), the piston is deflected as far as the stop. However, as soon as the piston butts against this stop it is held on this stop by the system pressure, so that to return it again into the central position a pressure equalization which is carried out is not sufficient, but additional measures must be employed. In this connection it is known to arrange a spring on the stop which co-operates with the end face of the piston, and when the pressure is equalized between the inflow side and the outflow side, this spring initially pushes the piston away from the stop and thus, after the bypass channel has been closed again, ensures the hydraulic return into the central position.

Starting from said known equipment, the object of the present invention is to simplify the aforementioned hydraulic return of the piston of the pressure difference sensor into its central position[H] without having to use additional springs or the like on the piston or in the cylinder space, which necessitates a certain additional cost and makes the measuring device more prone to malfunction.

SUMMARY OF THE INVENTION

This object is achieved according to the present invention in a measuring device of the type referred to above in that in the bypass channel a check valve is disposed which prevents a backflow from the outflow side to the inflow side. Thus when the piston of the pressure difference sensor butts against its maximum stroke stop and opens the bypass channel, the flowing fluid also opens the check valve, whereby a relatively unhindered flow can take place via the bypass line. If the pressure on the outflow side is greater again, when the pressure level on the inflow side is reached, any further flow in the direction of the outflow side via the pressure difference sensor will stop, whereby the check valve, which may preferably be designed as a non-return valve which is resilient or is bent in the end region against the free through flow direction, closes and the pressure building up on the end face of the piston on the outflow side in the associated cylinder region or the force thereby acting on the piston becomes greater and finally the piston is displaced so far in the direction of the central position that the bypass line is closed again. Then the freely movable piston can again serve for regulating the differential pressure between the inflow side and the outflow side of the displacement meter.

In a preferred embodiment of the invention at least the end face of the piston on the outflow side and/or the associated maximum stroke stop in the cylinder region is smaller than the other piston or cylinder diameter, which simplifies or assists the initial release of the piston from the stop away from the direction of the central position at small differential pressures.

BRIEF DESCRIPTION OF THE DRAWINGS

The invention is explained in greater detail below with reference to the embodiments illustrated schematically in the drawings.

DETAILED DESCRIPTION OF THE DEPICTED EMBODIMENT

Figure 1:
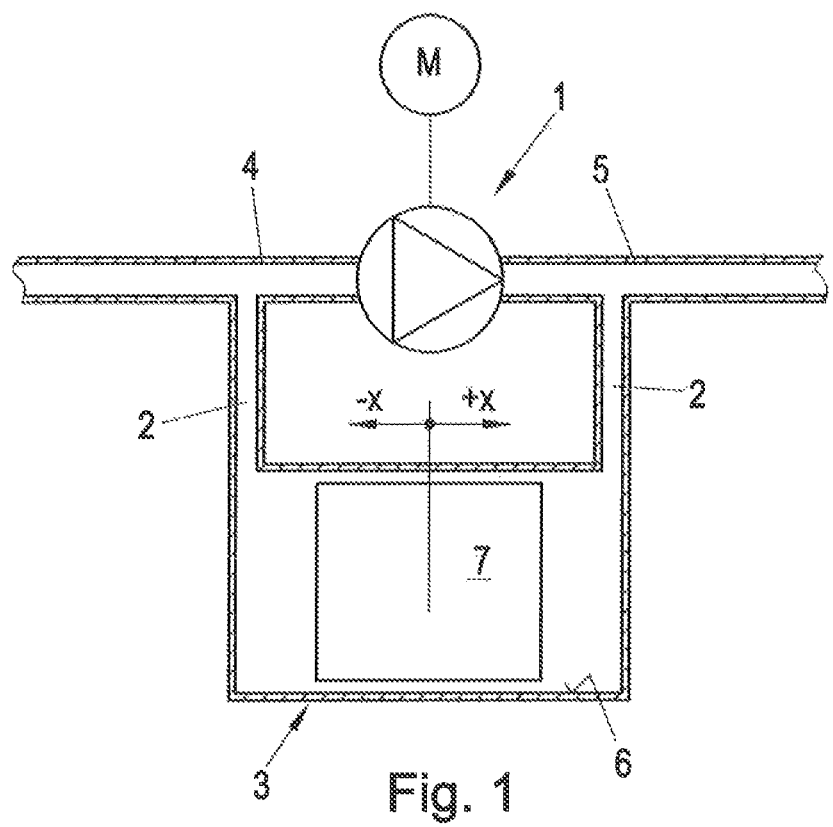
FIG. 1 shows a schematic sketch for explanation of the mode of operation of a flowmeter according to the invention.

The flowmeter according to FIG. 1 has a displacement meter 1 which may be configured for example as a known gearwheel meter and to which a pressure difference sensor 3 is connected in parallel in a bypass line 2. As a function of a differential pressure ascertained at the pressure difference sensor 2 between the inflow line 4 and the outflow line of the displacement meter 1, a motor M rotatably connected to the displacement meter 1 is controlled for constant differential pressure equalization. The pressure difference sensor 3 has a piston 7 which is freely movable in a cylinder region 6 of the bypass line 2 and of which the deflection due to the occurrence of a differential pressure is determined and is used for control of the motor M of the displacement meter 1. The deflection (−x/+x) of the piston 7 out of its central position according to the drawing is measured or monitored by a known sensor system in a manner which is not illustrated further—for example by means of optical sensors, Hall effect sensors, or the like.

Figure 2:
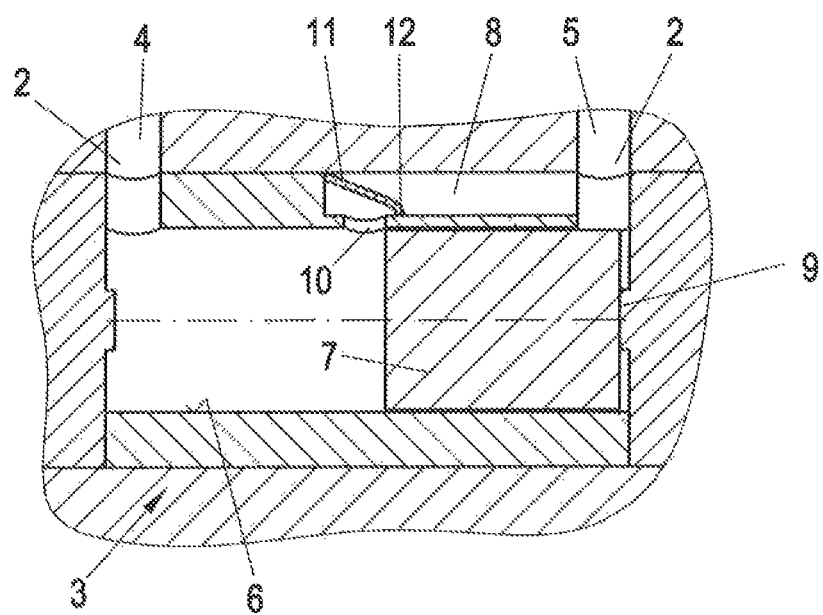
FIG. 2 shows a detail of the pressure difference sensor of a flowmeter according to the invention in an axial section through the piston.

In order now to enable flushing, especially in the event of a restart or in the event of high flow rates or large pressure differences between the inflow side 4 and the outflow side 5 of the displacement meter 1, and also for safety reasons to enable an overflow over the pressure difference sensor 3, according to FIG. 2 in the bypass line 2 a bypass channel 8 is provided which frees a connection between the inflow side 4 and the outflow side 5 when a piston butts against a maximum stroke stop 9 on the outflow side. In this case a bore 10 in the wall of the cylinder region 6 is freed by the piston 7 just before the piston 7 butts against the stop 9 according to FIG. 2. In this bypass channel 8 a check valve 11 (embodied for example as a resilient non-return valve 12 or, as illustrated, with a slight kink, so that the (open) valve is closed more securely when the flow is reversed) is disposed, which in the position illustrated in FIG. 1 is inoperable, since the bypass line 2 is in any case shut off by the piston. So long as the pressure on the inflow side 4 is higher than on the outflow side 5, medium will flow through the bore 10 into the bypass channel 8 (with the non-return valve 12 open, which is not illustrated) and from there to the outflow side 5. When the pressure on the inflow side and on the outflow side is equal again, the piston 7 remains for the time being on the stop 9 and (without the check valve 11) would also move away from there again only with difficulty, since the piston surface on the opposing free side is in any case larger than the free piston surface on the side of the stop 9. At first the closed non-return valve 12 enables the formation of a corresponding pressure on the end face of the piston on the stop side and thus a movement thereof in the direction of the central position as far as the bore 10 and thus the bypass channel 8 is closed again by the piston 7. The valve has a slight kink which helps to release the valve again from its first open position with the return flow. Therefore, a spring is not necessary here. Even if the valve is installed upside down (gravity can keep the valve open), the valve can close very early because of this kink.

In order to be able to release the piston 7 from the maximum stroke stop 9 initially more easily due to pressure, the corresponding end face of the piston (or, as illustrated here, the associated maximum stroke stop 9 in the cylinder region 6) has a smaller diameter than the other piston or cylinder diameter, which provides an initially larger contact surface for the actuation pressure.

The invention claimed is:

1. A flowmeter which comprises:
a displacement meter which includes an inflow line, an outflow line and a motor, a pressure difference sensor connected in parallel with the displacement meter in a bypass line, the bypass line having a first end in fluid connection with the inflow line and a second end in fluid connection with the outflow line, a differential pressure being ascertained at the pressure difference sensor between the inflow line and the outflow line, and as a function of the differential pressure, the motor rotatably connected to the displacement meter is controlled for constant differential pressure equalization between the inflow line and the outflow line, the pressure difference sensor having a piston which is freely movable in a chamber of the bypass line, the deflection of the piston due to the occurrence of the differential pressure is determined and is used for control of the motor of the displacement meter, the bypass line including a bypass channel which provides a connection between the inflow line and the outflow line when the piston butts against a maximum stroke stop, the maximum stroke stop limiting movement of the piston in a direction towards a second end of the bypass line, and
a check valve in the bypass channel which prevents backflow from the outflow side to the inflow side, wherein facing surfaces of the piston and the second end of the bypass line when abutting provide a space therebetween to enable elevated pressure in the outflow line to move the piston away from the second end.

2. The flowmeter according to claim 1, wherein said check valve is a non-return valve having a bent end.

\* \* \* \* \*